United States Patent [19]

Wigmore et al.

[11] Patent Number: 4,787,412
[45] Date of Patent: Nov. 29, 1988

[54] CARTRIDGE VALVE

[75] Inventors: Richard Wigmore, Brighton; Michael S. Abraham, Burgess Hill, both of England

[73] Assignee: Hagglunds Denison, Columbus, Ohio

[21] Appl. No.: 945,807

[22] Filed: Dec. 24, 1986

[51] Int. Cl.⁴ .......................................... F15B 13/044
[52] U.S. Cl. .......................... 137/454.2; 137/625.65; 251/129.1
[58] Field of Search ................... 137/454.2, 625.65; 251/129.1

[56] References Cited

U.S. PATENT DOCUMENTS 2,879,788 3/1959 Beckett et al. .............. 137/454.6 X
3,347,260 10/1967 Lewis et al. ................. 137/454.6 X
4,525,695 6/1985 Sheng et al. .................... 335/229 X Primary Examiner—Gerald A. Michalsky
Attorney, Agent, or Firm—Thomas S. Baker, Jr.

[57] ABSTRACT

A cartridge valve having a valve housing adapted to receive a valve cartridge containing a spool and intake and exhaust passages.

14 Claims, 2 Drawing Sheets

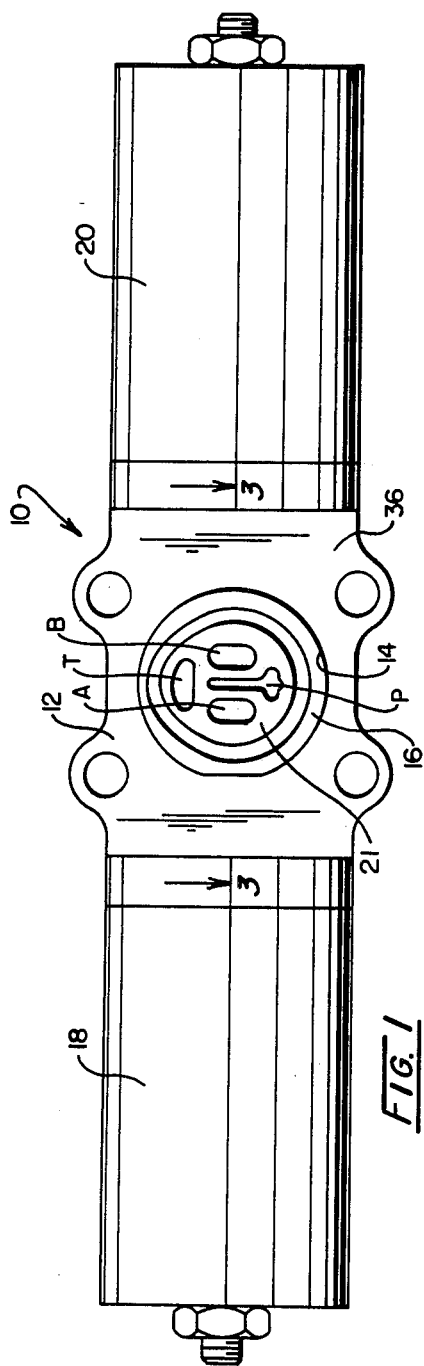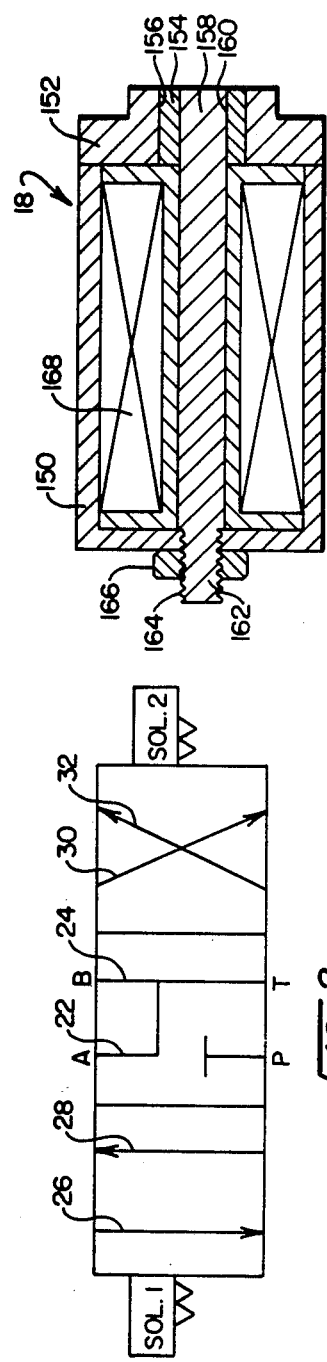

CARTRIDGE VALVE

BACKGROUND OF THE INVENTION

Valve housings of the type used in the construction of directional valves conventionally have been unitary structures, produced by casting processes. In these structures, all of the internal fluid passages are formed in the cast housing. If the valve is solenoid operated, solenoids may be attached to each end of the housing and centering springs placed in the housing between each solenoid and the valve spool.

One disadvantage of constructing a directional valve from a unitary housing, is that the fluid passages require that the housing be manufactured by casting which is a relatively expensive process compared to sintering or molding. Additionally, cast housing are relatively heavy. In solenoid operated valves in which centering springs are interposed between the solenoids and the valve spool, the length of the housing must be increased to provide space for the springs.

It is desireable to provide a lightweight housing for a directional valve which may be constructed economically by a process such as sintering or molding. Additionally, it is desireable to provide a solenoid operated valve in which the centering springs are not interposed between the solenoid and the spool such that the length of the housing may be reduced.

SUMMARY OF THE INVENTION

The instant invention provides a cartridge valve having a valve housing which may be constructed by sintering, molding or other similiarly economical process. The housing is adapted to receive a valve cartridge containing a spool and fluid intake and discharge passages. Additionally, the cartridge is adapted to receive a centering mechanism for centering the valve spool when solenoids are attached to the housing to operate the valve. With this design, springs are mounted in the cartridge and are not interposed between the solenoids and the spool. Consequently, the housing length may be reduced.

The invention further is directed to a cartridge valve, comprising a vlave housing having an opening for receiving a valve cartridge and a valve cartridge adapted to be inserted into the opening having a pressure port, a tank port, a first exhaust port and a second exhaust port. A moveable valve element is mounted in the valve cartridge and is moveable between a first position in which the pressure port is blocked, a second position in which the pressure port is connected to one of the first or second exhaust ports, and a third position in which the pressure port is connected to the other of the first or second exhaust ports. Operating means are mounted on the valve housing for operating the moveable valve element to one of the second or third positions.

BRIEF DESRIPTION OF THE DRAWINGS

FIG. 1 is a side view of the cartridge valve of the instant invention;

FIG. 2 is a schematic view of the operation of the solenoid operated directional valve;

FIG. 5 is a sectional view of a solenoid mounted on one end of the valve housing.

DESCRIPTION OF THE PREFERRED EMBODIMENT

Figure 3:
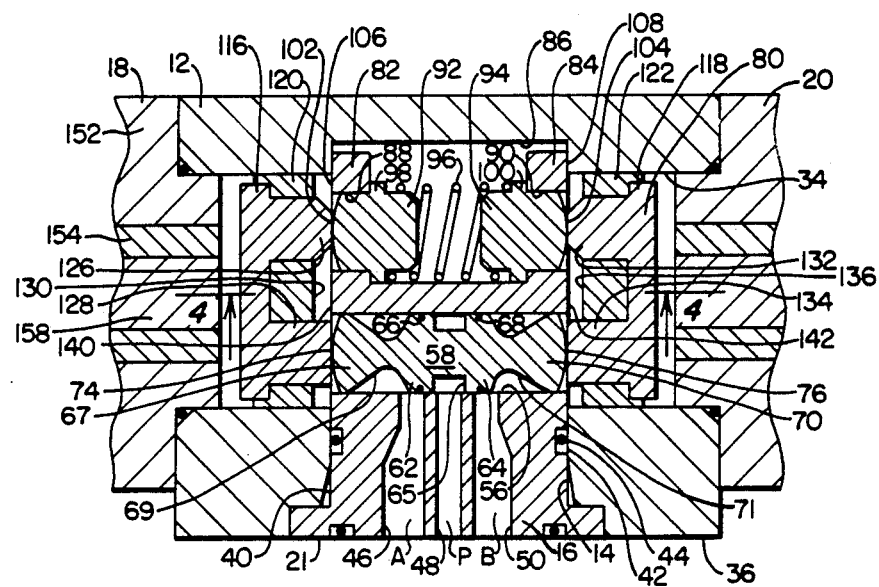
FIG. 3 is a sectional view along line 3—3 of FIG. 1.

Looking to FIG. 1, it may be seen that the cartrige valve 10 of the present invention includes a valve housing 12 having a bore 14 for receiving a valve cartridge 16. A pair of solenoids 18 and 20 are mounted at each end of valve housing 12 and serve to operate the valve element of cartridge 16 as described in detail hereinafter. Valve cartridge 16 includes a port P connected to a pump, not shown, for receiving pressure fluid, a port T connected to tank and a pair of exhaust ports A and B which may be connected to pilot lines or to some type of hydraulic actuator. As an example, port A may be connected to the rod end of an extensible and retractible hydraulic cylinder and port B may be connected to the piston end of the hydraulic cylinder. The port face 21 of cartridge 16 is lapped and is adapted to form a metal seal with a mating face on a pilot valve or on a manifold, not shown.

The operation of valve cartridge 16 as a 4-way directional valve, may be seen by referring to the schematic diagram illustrated in FIG. 2. It may be seen that when a valve element such as a spool is in the center position, the pressure port P is blocked and the exhaust ports A and B are connected to the tank port T through internal passages 22 and 24 within cartridge 16. When solenoid 1 is activated, pressure port P is connected to exhaust port A through internal passage 26 and exhaust port B is connected to tank port T through internal passage 28. Similarily when solenoid 2 is activated, pressure port P is connected to exhaust port B through internal passage 32 and exhaust port A is connected to tank port T through internal passage 30.

Valve housing 12 and valve cartridge 16 may be seen in detail by referring to FIG. 3. Valve housing 12 includes stepped lateral bore 14 for receipt of valve cartridge 16 and a longitudal bore 34 which intersects laternal bore 14. The bottom surface 36 of housing 12 which is parallel with port face 21 of cartridge 16 is likewise adapted to be mounted on a pilot valve or subplate, not shown. Such a pilot valve or subplate would contain a passage connected to a source of pressure fluid and would be adapted to be aligned with pressure port P in valve cartridge 16, internal passages adapted to be connected to pilot lines or a fluid actuator and aligned with exhaust ports A and B in cartridge 16 and a passage connected to tank T adapted to be aligned with tank port T. Valve housing 12 may be manufactured by a molding process, a sintered powdered metal process, or by casting.

Valve cartridge 16 includes a generally cylindrical outer surface 40 which is complementary to and is received in stepped bore 14. A groove 42 is formed in outer surface 40 for receipt of an O ring 44 to provide a fluid seal between valve cartrige 16 and valve housing 12.

Cartridge 16 contains internal fluid passages 46, 48 and 50 connected to exhaust port A, pressure port P and exhaust port B, respectively, and a fourth passage, not shown, connected to tank port T. Passages 46, 48 and 50 extend longitudinally through valve cartridge 16 from port face 21 and open into a lateral bore 56 which receives a spool 58. Spool 58 includes a pair of circular lands 62 and 64 which are separated by a groove 65 and which straddle fluid passage 48 when spool 58 is in the center position illustrated in FIG. 3. Spool 58 also includes a third land 67 separated from land 62 by a groove 69 and a fourth land 70 separated from land 64 by a groove 71. O-rings 66 and 68 seal lands 62 and 64 respectively in bore 56.

When spool 58 is moved to the right of the center position, pressure fluid passage 48 is connected to exhaust passage 50 through groove 65 and fluid in exhaust passage 46 is connected to tank through groove 69 and an internal passage, not shown, which opens into bore 56. Similiarly, when spool 58 is moved to the left of the centered position, pressure fluid passage 48 is connected to exhaust passage 46 through groove 65 and exhaust passage 50 is connected to tank through groove 71 and an internal passage, not shown, which opens into bore 56. When spool 58 is in the center position, fluid passages 46 and 48 are connected to tank port T through grooves 69 and 71, respectively, and the aforementioned internal fluid passages. Thus, it may be seen that valve cartridge 16 including spool 58 is a self contained 4-way directional valve adapted to be inserted in valve housing 12.

Figure 4:
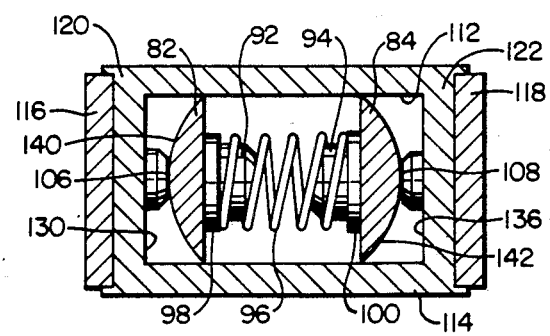
FIG. 4 is a view along line 4—4 of FIG. 3 illustrating the armature of the solenoid actuators for the valve.

Spool 58 in bore 56 is moved between the center position illustrated in FIG. 3 and a first operating position in which the spool 58 is moved to the right and pressure fluid passage 48 is connected to exhaust passage 50 and between the center position and a second operating position in which spool 58 is moved to the left and pressure fluid passage 58 is connected to exhaust passage 46 by a solenoid operated armature 80 which acts upon the ends 74 and 76 of spool 58. Turning to FIG. 4, it may be observed that valve cartridge 16 includes a pair of arms 82 and 84 which extend rearwardly towards the bottom face 86 of bore 14 in cartridge valve 10. A pair of bores 88 and 90 are formed in arms 82 and 84, respectively, parallel to spool bore 56, as illustrated in FIG. 3. A pair of spring retainers 92 and 94 are received in bores 88 and 90 respectively. Spring retainers 92 and 94 are urged apart by a spring 96. Spring retainers 92 and 94 include shoulders 98 and 100 which engage the inner surfaces of arms 82 and 84, respectively, when the spring retainers 92 and 94 are in their fully extended positions. In these positions, the outer surfaces 102 and 104 of retainers 92 and 94 are flush with the outer surfaces 106 and 108 of arms 82 and 84, respectively.

Looking again to FIG. 4, it may be seen that valve cartridge arms 82 and 84 containing spool 58 and spring retainers 92 and 94 pass through a rectangular opening 112 formed in armature assembly 80. Armature assembly 80 includes a cylindrical, non-magnetic housing 114 which slides axially in longitudinal bore 34 formed in valve housing 12. Referring to FIG. 3, it may be observed that armature assembly 80 further includes a pair of ferrous metallic inserts 116 and 118 affixed to or molded into the ends 120 and 122 respectively of housing 114. Insert 116 includes a pair of protuberances 126 and 128 which project beyond the inner surface 130 of housing end 120 and engage the outer surfaces 102 and 74 of spring retainer 92 and spool 58, respectively. Similarly, insert 118 includes a pair of protuberances 132 and 134 which project beyond the inner surface 136 of housing end 122 and engage the outer surfaces 104 and 76 of spring retainer 94 and spool 58, respectively.

It may be seen that spool 58 is in its center position when spring retainers 92 and 94 are in their fully extended positions in which shoulders 98 and 100 engage arms 92 and 94 as described above. In this position, the outer surface 102 of retainer 92 is coupled directly to the outer surface 74 of spool 58 through insert 116 and the outer surface 104 of spring retainer 94 is coupled to the outer surface 76 of spool 58 through insert 118. In the center position, the inner surface 130 and 136 of housing ends 120 and 122, respectively, are spaced from the outer walls 140 and 142 of cartridge arms 82 and 84, respectively. In order to move spool 58 to the right to thereby connect spool groove 65 with pressure passage 48 and exhaust passage 50, solenoid 20 is activated and armature 80 is moved to the right as will be described herein below. When this occurs, the force of spring 96 is overcome, spring retainer 92 is moved inwardly and inner surface 130 of housing end 120 engages the outer surface 104 of arm 81. In a similar manner, solenoid 18 is activated to move spool 58 to the left such that pressure passage 48 is connected to exhaust passage 46. When this occurs, the force of spring 96 is overcome, spring retainer 94 is moved inwardly and the inner surface 136 of housing end 122 engages the outer surface 142 of retainer arm 84. When solenoids 18 and 22 are deactivated, spring 96 acts upon spring retainers 92 and 94 and forces them to move to their outermost positions. When this occurs, inserts 116 and 118 are centered and these elements act upon spool 58 to thereby move it to its center position.

The operation of solenoids 18 and 20 to move armature 80 may be seen by referring to FIG. 5 which is a sectional view of solenoid 18. Solenoid 18 is a direct current device and includes a solenoid case 150 and a pole flange 152. A non-magnetic annular ring 154 is inserted in a bore 156 formed in flange 152. A magnetic core 158 passes through a bore 160 formed in ring 154 and extends axially through case 150. Core 158 has a threaded end 162 which extends through a casing bore 164 and is retained in position by a nut 166. The windings of solenoid 118 are shown at 168. When solenoid 18 is activated, a magnetic flux flows through the fixed center core 158, through retaining nut 166, into case 150, and across the metal to metal gap between case 150 and flange 152. The flux then passes across the gap between pole flange 152 and armature insert 116 and finally from insert 116 to center core 158 as may be seen by looking to FIG. 3. This magnetic flux causes armature 80 to overcome the force of spring 96 and moves spring retainer 94 and spool 58 to the left such that pressure passage 48 is connected to exhaust passage 46 through groove 65 as described above. In a similar manner. solenoid 20 may be activated to cause armature 80 to overcome the force of spring 96 and move spring retainer 92 and spool 58 to the right as described above.

Although in the preferred embodiment illustrated above solenoids 18 and 20 act upon armature 80 to move spool 58, the spool 58 also could be driven by pneumatic or hydraulic fluid pressure.

Since certain changes may be made in the above system and apparatus without departing from the scope of the invention herein involved, it is intended that all matter contained in the description or shown in the accompanying drawings shall be interpreted as illustrative and not in a limiting sense.

We claim:

1. A cartridge valve which comprises:
    a valve housing having a first opening for a valve cartridge:
    a valve cartridge inserted into said first opening in said valve housing having a pressure port, a tank port, a first exhaust port and a second exhaust port;

a valve element mounted in said valve cartridge movable between a first operative position, a second operative position and a third operative position;

operating means mounted in said valve housing for operating said moveable valve element from said first operative position to one of said second or said third operative positions;

spring means mounted in said valve cartridge for biasing said valve element towards said first said operative position;

said operating means including a solenoid and a unitary armature element;

said armature element including a second opening for receiving a portion of said valve cartridge; and a portion of said valve cartridge mounted in said second opening.

2. The cartridge valve of claim 1 in which:
said armature element simultaneously engages said valve element and said spring means in said valve cartridge when said operating means moves said valve element to one of said second or said third operative positions.

3. The cartridge valve of claim 2 in which:
said spring means includes a pair of spring retainers and a spring; and
wherein said spring acts to bias said retainers apart.

4. The cartridge valve of claim 1 in which:
said armature element includes a housing having a pair of integral inserts each having a pair of laterally displaced protuberances;
wherein one protuberance of one of said inserts engages one end of said valve element and the other protuberance of said one insert engages one end of said spring means; and
wherein one protuberance of the other of said inserts engages the other end of said valve element and the other protuberance of said other insert engages the other end of said spring means.

5. The cartridge valve of claim 1 in which:
said armature element includes a non-metallic housing and a pair of metallic inserts mounted in said housing.

6. A cartridge valve which comprises:
a valve housing having a first opening for receiving a valve cartridge;
a valve cartridge inserted into said first opening in said opening in said valve housing having a pressure port, a tank port, a first exhaust port and a second exhaust port,
a valve element mounted in said valve cartridge moveable between a first operative position, a second operative position and a third operative position;
operating means mounted in said valve housing for operating said moveable valve element from said first operative position to one of said second or said third operative positions;
spring means mounted in said valve cartridge for biasing said valve element towards said first said operative position;
a first bore formed in said valve cartridge for receiving said valve element;
a second bore formed in said valve cartridge for receiving said spring means; and
wherein the axes of said first and said second bores are laterally displaced and are parallel.

7. The cartridge valve of claim 6 in which:
said spring means includes a pair of spring retainers and a spring; and
wherein said spring acts to bias said retainers apart.

8. The cartridge valve of claim 6 in which:
said operating means includes a solenoid and a unitary armature element;
said armature element includes a housing having a pair of integral inserts each having a pair of lateral displaced protuberances;
wherein one protuberance of one of said inserts engages one end of said valve element and the other protuberance of said one insert engages one end of said spring means; and
wherein one protuberance of the other of said inserts engages the other end of said valve element and the protuberance of said other insert engages the other end of said spring means.

9. The cartridge valve of claim 6 in which:
said operating means includes a solenoid and a unitary armature element; and
said armature element includes a non-metallic housing and a pair of metallic inserts mounted in said housing.

10. A cartridge valve which comprises:
a valve housing having a first opening for receiving a valve cartridge;
a valve cartridge inserted into said first opening in said valve housing having a pressure port, a tank port, a first exhaust port and a second exhaust port;
a valve element mounted in said valve cartridge moveable between a first operative position, a second operative position and a third operative position;
operating means mounted in said valve housing for operating said moveable valve element from said first operative position to one of said second or said third operative positions;
said operating means includes a solenoid and a unitary armature element;
spring means mounted in said valve cartidge for biasing said valve element towards said first valve position;
a first bore formed in said valve cartridge for receiving said valve element;
a second bore formed in said valve cartridge for receiving said spring means;
wherein the axes of said first and said second bores are laterally displaced and are parallel;
said valve housing including a second opening for receiving said armature element;
said armature element including a third opening for receiving a portion of said valve cartridge;
said valve cartridge being mounted within said third opening;
wherein said armature simultaneously engages said valve element and said spring means; and
wherein said second opening is parallel to said first and said second bores formed in said valve cartridge.

11. The cartridge valve of claim 10 in which:
said third opening for receiving said cartridge extends perpendicular to said first and said second bores.

12. The cartridge valve of claim 10 in which:
said valve means and said spring means are positioned within said armature.

13. The cartridge valve of claim 10 in which:

said armature element includes a housing having a pair of integral inserts each having a pair of laterally displaced protruberances;
wherein one protruberance of one of said inserts engages one end of said valve element and the other protruberance of said one insert engages one end of said spring means; and
wherein one protruberance of the other of said inserts engages the other end of said valve element and the other protruberance of said other insert engages the other end of said spring means.

14. The cartridge valve of claim 10 in which:
said armature element includes a non-metallic housing and a pair of metallic inserts mounted in said housing.

* * * * *